(12) United States Patent
Gerhardt (10) Patent No.: US 9,296,534 B2
(45) Date of Patent: Mar. 29, 2016

(54) ASYMMETRICALLY RELEASABLE FASTENER SYSTEM AND CUFF FOR USE THEREWITH

(71) Applicant: ThinLine, LLC, Durham, NC (US)

(72) Inventor: Evan Michael Gerhardt, Alden, NY (US)

(73) Assignee: THINLINE, LLC, Durham, NC (US)

( * ) Notice: Subject to any disclaimer, the term of this patent is extended or adjusted under 35 U.S.C. 154(b) by 0 days.

(21) Appl. No.: 14/246,980

(22) Filed: Apr. 7, 2014

(65) Prior Publication Data

US 2014/0310925 A1      Oct. 23, 2014

Related U.S. Application Data

(60) Provisional application No. 61/808,724, filed on Apr. 5, 2013.

(51) Int. Cl.
| | |
|---|---|
| *A01K 13/00* | (2006.01) |
| *A41B 7/00* | (2006.01) |
| *B65D 63/10* | (2006.01) |
| *A41B 7/02* | (2006.01) |

(52) U.S. Cl.
CPC ............. *B65D 63/1018* (2013.01); *A41B 7/02* (2013.01); *Y10T 24/45246* (2015.01)

(58) Field of Classification Search
CPC ........ A61B 7/02; A61B 3/02; B65D 63/1018; Y10T 24/45246
USPC ............................................ 24/593.11; 54/82
See application file for complete search history.

(56) References Cited

U.S. PATENT DOCUMENTS

| | | | | |
|---|---|---|---|---|
| 215,956 | A | * | 5/1879 | Miller .......................... 24/574.1 |
| 218,880 | A | * | 8/1879 | Hill ............................ 24/593.11 |
| 553,012 | A | | 1/1896 | McCawly |
| 568,617 | A | | 9/1896 | Johnson |
| 771,312 | A | | 10/1904 | Koehler |
| 809,465 | A | * | 1/1906 | Roy et al. .................... 24/593.11 |
| 880,116 | A | * | 2/1908 | Arnow ........................ 24/593.11 |
| 927,627 | A | | 7/1909 | York |
| 1,073,714 | A | | 9/1913 | Shorten |
| 1,596,958 | A | * | 8/1926 | Wordingham .................. 223/83 |
| 1,660,665 | A | * | 2/1928 | Aleksandrowicz ............. 24/700 |

(Continued)

FOREIGN PATENT DOCUMENTS

WO      2010103510 A1      9/2010

OTHER PUBLICATIONS

Search Report and Written Opinion for International Patent Application No. PCT/US2014/033209; Nov. 7, 2014.

*Primary Examiner* — Victor Batson
*Assistant Examiner* — Jason W San
(74) *Attorney, Agent, or Firm* — Jason A. Bernstein; Barnes & Thornbug LLP (57) ABSTRACT

A fastener system comprising a strap incorporating a plurality of teeth and comprising a buckle incorporating a plurality of slots. The strap can be engaged by the buckle such that the strap resists disengagement by a separating force applied generally equally across the width of the strap and the buckle, but will disengage upon application of an asymmetrical force applied proximate either just to the top edge or just to the bottom edge of the buckle and strap. The fastener system can be associated with a cuff or other article so as to releasably maintain two opposing side edges of the cuff in proximity to each other.

11 Claims, 10 Drawing Sheets

(56) References Cited

U.S. PATENT DOCUMENTS

| | | | | |
|---|---|---|---|---|
| 1,762,528 A | * | 6/1930 | Rubinstein | 2/140 |
| 1,804,725 A | * | 5/1931 | Walker | 24/20 TT |
| 2,162,536 A | * | 6/1939 | O'Mealia | 2/123 |
| 2,253,837 A | * | 8/1941 | Augspurger | A61D 9/00 168/2 |
| 2,424,656 A | * | 7/1947 | Goldblatt | 24/593.11 |
| 2,428,158 A | * | 9/1947 | Hermer | 2/124 |
| 2,524,448 A | * | 10/1950 | Kaplan | 2/123 |
| 2,886,935 A | * | 5/1959 | Shelton | A01K 13/007 54/71 |
| 2,935,773 A | | 5/1960 | Weckesser | |
| 3,124,919 A | * | 3/1964 | Thompson | A01K 13/007 2/24 |
| 3,248,853 A | * | 5/1966 | Code | A01K 13/007 54/82 |
| 3,284,989 A | * | 11/1966 | Code | A01K 13/007 54/82 |
| 4,008,512 A | | 2/1977 | Prodel | |
| 4,483,556 A | | 11/1984 | LiVolsi | |
| 4,547,953 A | | 10/1985 | LiVolsi | |
| 4,548,026 A | | 10/1985 | Shidner | |
| 4,631,782 A | | 12/1986 | Gecs | |
| 4,653,205 A | * | 3/1987 | Koch | 36/118.6 |
| 4,903,996 A | | 2/1990 | Herr | |
| 4,951,362 A | | 8/1990 | Denemark et al. | |
| 5,416,952 A | | 5/1995 | Dodge | |
| 5,474,268 A | | 12/1995 | Yu | |
| D365,894 S | | 1/1996 | Davis | |
| 5,687,455 A | * | 11/1997 | Alexander | 24/16 PB |
| 5,852,852 A | | 12/1998 | Rigal | |
| 5,887,318 A | | 3/1999 | Nicoletti | |
| 6,163,941 A | * | 12/2000 | Lai | 24/593.11 |
| 6,175,994 B1 | | 1/2001 | Nicoletti | |
| 6,266,852 B1 | | 7/2001 | Tai | |
| 6,467,132 B1 | | 10/2002 | Robley | |
| 6,488,664 B1 | | 12/2002 | Solomon et al. | |
| 6,662,537 B1 | | 12/2003 | Wilson | |
| 7,100,248 B2 | | 9/2006 | Crook | |
| 7,434,378 B2 | | 10/2008 | Wilson | |
| 7,877,845 B2 | | 2/2011 | Signori | |
| 7,900,324 B2 | | 3/2011 | Ginocchio | |
| 8,266,720 B2 | * | 9/2012 | Voravan et al. | 2/161.2 |
| 8,683,665 B2 | * | 4/2014 | Fraze | 24/593.11 |
| 2001/0011594 A1 | * | 8/2001 | Clark | A01K 13/007 168/2 |
| 2003/0167739 A1 | * | 9/2003 | Clark | A01L 5/00 54/82 |
| 2006/0162296 A1 | * | 7/2006 | Maestrini | A01L 3/00 54/82 |
| 2006/0231045 A1 | * | 10/2006 | Lindley | A01K 13/007 119/856 |
| 2007/0068125 A1 | * | 3/2007 | Davis | A01L 15/00 54/82 |
| 2008/0083198 A1 | * | 4/2008 | Wilson | A01K 13/007 54/82 |
| 2008/0083542 A1 | * | 4/2008 | Ford | A01L 3/06 168/18 |
| 2008/0264005 A1 | * | 10/2008 | Ford | A01L 3/00 54/82 |
| 2009/0032270 A1 | * | 2/2009 | Ruetenik | A01K 13/007 168/28 |
| 2009/0178256 A1 | | 7/2009 | Toth | |
| 2010/0281661 A1 | * | 11/2010 | Harada et al. | 24/593.11 |
| 2011/0185472 A1 | * | 8/2011 | Voravan | 2/161.2 |
| 2012/0272485 A1 | | 11/2012 | Liang | |
| 2014/0130466 A1 | * | 5/2014 | Potter | A01L 15/00 54/82 |
| 2015/0047303 A1 | * | 2/2015 | Caswell | A61D 9/00 54/82 |
| 2015/0157435 A1 | * | 6/2015 | Chasins | A61B 5/6829 600/301 |

* cited by examiner

ASYMMETRICALLY RELEASABLE FASTENER SYSTEM AND CUFF FOR USE THEREWITH

CROSS-REFERENCE TO RELATED APPLICATION

This application claims benefit of U.S. provisional patent application No. 61/808,724, filed Apr. 5, 2013, entitled EQUINE BOOT, and commonly assigned to the assignee of the present application, the disclosure of which is incorporated by reference in its entirety herein.

FIELD

The present disclosure relates generally to fastener systems comprising a buckle into which a strap can be inserted. The present disclosure also relates to a fastener system incorporated into an object for releasably fastening two portions of the object.

BACKGROUND

Many fastener systems exist for joining and separating two objects or two portions of an object. Buckle and strap-type fastener systems that use teeth to engage slots or other mating devices have existed for some time. Such systems typically resist separation when a separation force is applied in opposite directions to the buckle and the strap. Generally, the fastener resists a separation force applied across the width of the strap and the buckle. The strap is typically released from the buckle by some mechanism, such as a lever or some other device that facilitates or permits disengagement of the teeth.

It would be desirable to have a fastener system that would resist separation when a separating force is applied roughly across much of the width of the buckle and the belt, but would permit separation where the separation forces are applied asymmetrically to the buckle and the strap, thereby obviating the need for manipulating a portion of the buckle to disengage some device before the teeth can be disengaged.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to the more detailed description below.

In exemplary embodiments, a fastener system is provided A fastener system, comprising a buckle comprising a base, top member having a front edge and a rear edge, the top member being associated with the base at a top member first leg and second leg, the top member further having an upper surface, a channel defined between the base, the top member and the first and second legs, and a plurality of generally parallel slots defined in the top member, each slot having a front side being generally straight, a rear side being curved and being tapered in a direction from the top member rear edge toward the top member front edge. The fastener system further comprises a strap adapted to releasably be engaged in the channel, the strap comprising first end portion, a second end portion, a top side edge and a bottom side edge, and a plurality of teeth associated with and extending generally upward from proximate to the first end portion, each tooth having an elongated first side wall extending generally perpendicularly upward from the strap, and an elongated second side wall tapering from the first side wall in a direction from the strap first end portion toward the second end portion, the second side wall being curved, each tooth further including a first short edge and opposing second short edge, each short edge having a shoulder. Each slot is adapted to engage a tooth when the strap first end portion and at least one tooth are inserted into the buckle channel such that the strap top edge is proximate to the top member first side edge. The strap is adapted to disengage from the buckle when a first force is exerted on an area proximate to the buckle top member first side edge and a second opposing force is exerted on an area proximate to the strap top side edge, the first and second forces being generally in opposing directions with respect to each other so as to cause the tooth first short edge area of at least one tooth to disengage from the slot prior to the remainder of the tooth disengaging, the slot being the one in which such tooth had been engaged.

In exemplary embodiments, the fastener system is adapted to be associated with a generally conical frustum-shaped cuff.

In exemplary embodiments, provided is a cuff having a releasable fastener, comprising a cuff comprising generally frustum-shaped body having a top portion and a bottom portion, the bottom portion having a diameter wider than the top portion, and further having a front portion, rear portion, top edge and bottom edge, first side edge and second side edge, whereby the first side edge and second side edge are proximate to each other at the front portion. Further included is a fastener system as described hereinabove, whereby when a first asymmetrical separating force is exerted on an area of the top portion of the cuff first side and proximate to the buckle top member first side edge and a second opposing asymmetrical separating force is exerted on an area of the top portion of the cuff second side and proximate to the strap top side edge, the first and second separating forces being generally in opposing directions with respect to each other so as to cause the tooth first short edge area of at least one tooth to disengage from the slot prior to the remainder of the tooth, the slot being the one in which such tooth had been engaged.

BRIEF DESCRIPTION OF THE DRAWINGS

The drawings disclose exemplary embodiments in which like reference characters designate the same or similar parts throughout the figures of which.

DETAILED DESCRIPTION

Unless otherwise indicated, the drawings are intended to be read (for example, cross-hatching, arrangement of parts, proportion, degree, or the like) together with the specification, and are to be considered a portion of the entire written description. As used herein, the terms "horizontal", "vertical", "left", "right", "up" and "down", as well as adjectival and adverbial derivatives thereof (for example, "horizontally", "rightwardly", "upwardly", or the like), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate. When the words "equine" and "horse" are used they are intended to include all animals resembling a horse and having hooves similar in shape to a horse even though smaller. Thus, the latter two terms are intended to include hooved animals of all types, including, but not limited to, mules, ponies of all types, zebras, cows, and the like.

In exemplary embodiments, as shown in FIGS. 1-19 a fastener system 10 generally includes a buckle 20 and a strap 22.

In exemplary embodiments, the buckle 20 comprises a base 30 and a top member 32. The top member 32 has a front edge 34 and a rear edge 36, and a top edge 38 and a bottom edge 40 (when viewed from the top, such as in FIG. 1). The top member 32 is associated with the base 30 by a first leg 42 and a second leg 44. The top member 32 has an upper surface 46 and a lower surface 48. The lower surface 48, the first and second legs 42, 44 and the base 30 define a channel 50 and a channel opening 52 area through which the strap 22 can be inserted. In exemplary embodiments, the buckle 20 may be generally rectangular shaped (when viewed from the top, as in FIG. 1). Alternatively, the buckle 20 may have front and rear edges 34, 36 that are nonparallel with respect to each other.

In exemplary embodiments, the top member upper surface 46 may be bowed or curved (with respect to the generally flat base) across at least a portion of the distance between the first and second legs 42, 44. A plurality of generally parallel slots 60 are defined in the lower surface 48 of the top member 32. Each slot 60 has an elongated first side 62 being generally straight and an opposing elongated second side 64. The slot 60 also includes first and second short side edges 66, 68. In exemplary embodiments, the first and second short side edges 66, 68 each have a shoulder 70, 72, respectively. In exemplary embodiments, the shoulders 70, 72 are each at an angle generally perpendicular to the top member upper surface 46. The second side 64 is curved away from the first side 62 and at least a portion of which is tapered in a direction from the top member rear edge 36 toward the top member front edge 34.

In exemplary embodiments, the top member front edge 34 may be beveled or raised in a boss 74 to increase the size of the initial opening of the channel and to make it easier to insert the strap into the channel. In exemplary embodiments, the rear edge may have a raised area or boss 76 similar to the front edge boss 72. In exemplary embodiments, the gripping boss 74 may comprise one or more grip enhancing means 75 for improving the ability to grip the leading edge of the buckle, such as when the buckle or fingers are wet or gritty. In exemplary embodiments, the gripping boss 74 may be a flange extending upward from a portion of the buckle leading edge. In exemplary embodiments, the gripping boss 74 may comprise a recessed area cut into the leading edge of the leading edge of the buckle. The recessed area may be an under cut that is beveled to create a notched area. In exemplary embodiments, the gripping boss 74 may comprise a notched area in the leading edge of the buckle 20. In exemplary embodiments, the undercut area may include one or more ridges, bumps or other protrusions, or may include one or more grooves, slots, or other recessed areas to further enhance the ability to grip the leading edge of the buckle 20.

In exemplary embodiments, each slot 60 may generally form in the top member 32 a negative of generally an equivalent shape as a "positive" tooth does extending from the strap 22, as described in further detail herein.

In exemplary embodiments, the slots 60 are generally parallel and abutting or proximate to each other, with the first side wall 62 of one slot 60 abutting or proximate to the second side wall 64 of an adjacent slot 60.

In exemplary embodiments, the strap 22 has a top face 80, bottom face 82, a first end portion 84 and a second end portion 86. The strap 22 also has a top edge 87 and a bottom edge 88. In exemplary embodiments, a plurality of teeth 90 extending upwardly from the top face 80. The teeth 90 are adapted to engage the buckle slots 60 when the strap 22 is inserted into the buckle channel 50.

In exemplary embodiments, each tooth 90 has an elongated first side wall 92 extending generally perpendicularly (or at a slight angle from the perpendicular) upward from the top face 80, and an elongated second side wall 94 tapering from the first side wall 94 in a direction from the strap first end portion 84 toward the second end portion 86. In exemplary embodiments, the first side wall 92 is generally straight and the second side wall 94 is curved. The tooth 90 further includes a first short edge 96 and opposing second short edge 98. In exemplary embodiments, each short side edge has a shoulder 100, 102, respectively. In exemplary embodiments, the shoulders 100, 102 are each at an angle generally perpendicular to the top face 80.

In exemplary embodiments, the fastener system 10 may be associated with an object or article(s) having generally opposing (though not necessarily parallel or perpendicular) portions that can be drawn into proximity to each other and fastened in place. In exemplary embodiments, the object may be a cuff. The reference herein to a cuff is intended to be a nonlimiting example. Other exemplary embodiments of objects and articles are described in further detail hereinbelow.

In exemplary embodiments, at least a portion of a cuff 110 may have a generally conical frustum shape and having a first portion 112 having a first side edge 114 and a second portion 116 having an opposing a second side edge 118. In exemplary embodiments, the first and second side edges 114, 118 are proximate to or abutting each other. The first and second side edges 114, 118 may be maintained in this relationship (or separated) by means of the fastener system 10. The cuff 110 also has a top portion 120 terminating in a top rim 122 and a bottom portion 124 terminating in a bottom rim 126. In exemplary embodiments, the cuff 110 may be made of a material flexible enough for a user to be able to separate the first and second side edges 114, 118 so that the cuff 110 may be slipped over or around an object. In alternative exemplary embodiments, the cuff 110 may have a first section and a second section, each section having a first and a second side, whereby the first section and second section are attached by a hinge at the first side of each. The hinge may be a flexible portion of material, or the hinge may be a pin that connects two wing portions, one wing portion associated with the first side of each cuff section.

The second portion 86 of the strap 22 is adapted to be associated with the second portion 116 of the cuff 110, such as by adhesive, sonic welding, fusing, sewing, fasteners, or the like, or may be formed as part of the cuff 110. The buckle 20 may be associated with the first portion 112 of the cuff 110 in a similar manner. It is to be understood that the buckle 20 and strap 22 can be reversed in their association with the first and second portions 112, 116 of the cuff.

In exemplary embodiments, the buckle 20 and strap 22 may be associated with a cuff 110 at a position proximate to the bottom (wider) portion of the cuff. This configuration can allow for easier separation of the strap 22 from the buckle 20 as a user grasping the top portion 120 of the cuff 110 will have greater leverage and can create a greater angle between the top edge 38 of the buckle and the top edge 87 of the strap 22, thereby enabling the teeth 90 to disengage from the slots 60.

In exemplary embodiments, the front edge 34 of the buckle 20 is generally parallel to the first side edge 114 (or, if the buckle 20 is associated with the second portion 116, it is generally parallel to the second side edge 118).

In exemplary embodiments, the configuration of the teeth 90 and slots 60 is related to the flexibility of the buckle 20 and strap 22 material and the material of the cuff 110. For example, a softer, more flexible material may have a tooth 90 configured with the first side wall 92 being less than 90 degrees (i.e., less than perpendicular to the top face of the strap) to compensate for the softer material and the force required to separate the teeth 90 from the slots 60.

The strap 22 can be inserted into the channel 50 via the opening 52. The teeth 90 engage with the slots 60 to maintain the strap 22 (or at least a portion thereof) in engagement with the buckle 20. This tooth-in-slot engagement resists separation when a separating force is exerted generally across the width of the strap 22 or the buckle 20 or both.

The strap 20 is adapted to disengage from the buckle 20 when a first force is exerted on an area proximate to the buckle 20 top member 32 top edge 38 and a second opposing force is exerted on an area proximate to the strap 22 top side edge 87, the first and second forces being generally in opposing directions with respect to each other. The separating forces cause the first short edge area 96 of at least one tooth 90 to disengage from the slot 60 in which that tooth 90 is engaged prior to the remainder of the tooth 90 disengaging.

In exemplary embodiments, when separation is desired, the separating force is applied asymmetrically; i.e., it is not applied equally across the width of the buckle 20 or the strap 22. The structure and interaction of the teeth 90 and the slots 60 are the reason for this asymmetrical separation force feature. When a separating force is exerted at either the top or bottom edge 38, 40 of the buckle 20 and the top or bottom edges of the 87, 88, the strap 22, one short side edge 96 of the tooth 90, which also has a shorter height than the middle portion of the curved portion of the tooth 90, is dislodged from the slot 60 more easily (i.e., with less force) than the middle portion of the tooth 90, which has a greater height and is therefore more deeply engaged in the slot 60. The (top 87 or bottom 88) edge of the strap 22 to which the separating force is applied, slides slightly in the channel 50, which is followed by the rest of the strap 22 sliding out of the channel 50.

Figure 17:
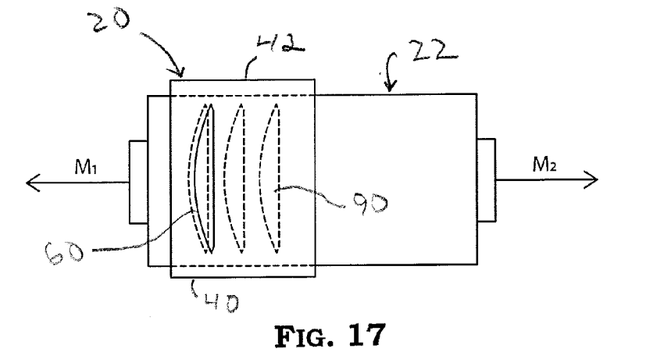
FIG. 17 a front schematic view of a buckle and strap showing force lines M1 and M2 applied generally symmetrically at the middle portions of the buckle and the strap.
Figure 18:
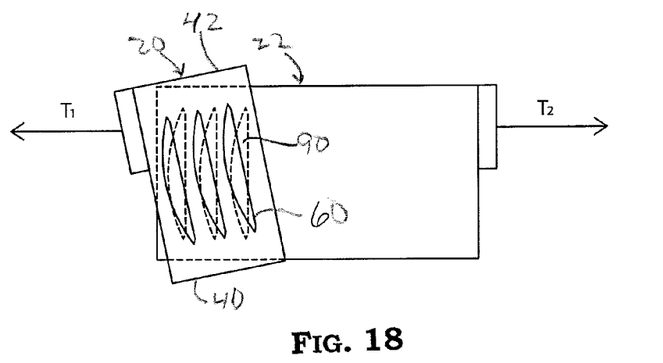
FIG. 18 a front schematic view of a buckle and strap showing force lines T1 and T1 applied generally asymmetrically at the top portion of the buckle and the strap.
Figure 19:
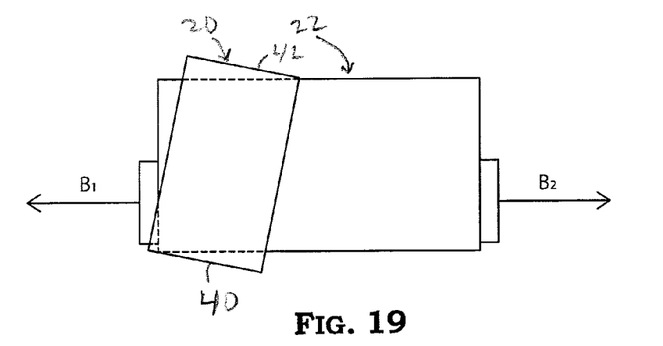
FIG. 19 a front schematic view of a buckle and strap showing force lines B1 and B1 applied generally asymmetrically at the bottom portion of the buckle and the strap.

It is to be understood that the amount of separating force applied to the top 38 or bottom 40 edge of the buckle 20 and the strap 22 may be uneven; in other words, there may be more separating force applied to the buckle 20 than to the strap 22, or vice versa. It is to be further understood that in exemplary embodiments, the asymmetrical separating force may be applied to just the buckle 20 or to just the strap 22. It is to be understood that reference to the pulling force being at generally the top or bottom edge is intended to mean that the pulling force is exerted generally more at the top or bottom rather than at the middle of the strap 22. This asymmetrical separating force concept is shown in FIGS. 17-19, which show force lines T (top), B (bottom), and M (middle). The areas of the buckle 20 or strap 22 associated with the force lines represent the general areas of the structure to which the force is applied.

It is to be understood that in the foregoing discussion of the location on the buckle or the strap of the pulling force, reference to a top or bottom edge of the buckle or strap is intended to include the area generally near that edge, not just the edge itself.

In exemplary embodiments, the fastener system of the present disclosure is designed so that when the strap 22 is retained in the buckle 20, the strap 22 resists disengagement when the separating force is applied to generally the middle of the strap 22 and the middle of the buckle 20, or when the separating force is applied generally evenly across a significant portion of the width of the buckle 20 and a significant portion of the width of the strap 22.

The separating force required to initiate disengagement of the strap 22 is lower at the areas proximate to either the top edge or bottom edge of the buckle 20 and strap 22 than at the middle. The separating force needed to disengage the strap 22 from the buckle 20 is higher where the separating force is applied generally evenly across the width of the buckle 20 and the strap 22 than the separating force applied to the either the top or bottom side edge area of the buckle 20 and the strap 22.

In exemplary embodiments, the strap 22 can also be separated from the buckle 20 by applying a lifting or pulling force (illustrated in FIG. 11 as force line L) on the top member the front edge of the buckle 20 so as to slightly pull the top member front edge away from the base, thereby increasing the height of the channel and allowing the teeth to disengage from the slots.

In exemplary embodiments, a fastener as described herein can be useful in situations where it is undesirable for the buckle 20 and strap 22 to separate when separating force is evenly applied across the width or at the middle of the buckle 20 and the strap 22, but separation is desirable when the separation force is applied asymmetrically at the top or bottom side of the buckle 20 and strap 22.

In exemplary embodiments, the fastener system described herein may be used in conjunction with a boot designed for use with a horse or other hoofed animal. When engaged in vigorous jumping, running, turning, stopping, and/or accelerating the horse frequently overreaches with a hind leg causing the front of a rear hoof to strike the rear of a front hoof and/or leg which may cause injury which can temporarily, or sometimes permanently, incapacitate or handicap the horse.

FIG. 12-16 shows one exemplary embodiment of a fastener system 10 used with a cuff 110 comprising an equine boot 140 having a first portion 112 and a first edge 114, and a second portion 116 having a second edge 118. The boot 140 has a top portion 120 and a top rim 122, and also has a bottom portion 124 and a bottom rim 126. The boot 140 is adapted to wrap around the bottom portion of a leg. The boot 140 has a seam 128 in the front of the boot 140 where the first edge 114 and the second edge 118 meet or are in proximity to one another. In exemplary embodiments, the boot 140 is generally conical frustum-shaped, with the top rim 122 having a narrower diameter than the bottom rim 126.

In exemplary embodiments, the boot 140 may be made of a material sufficiently flexible so that the boot 140 can be removed from the lower leg of a horse, but is strong enough to provide protection for the sensitive areas of the hoof. Also, the boot 140 must have sufficient weight to stay in the correct position with respect to the hoof and to prevent it from rotating about the hoof. For example, the boot 140 may be constructed from a elastomeric material such as a polyurethane having a durometer range of about 60 A-80 A. Other materials having similar properties may also be substituted as will be evident to persons of ordinary skill in the art based on this disclosure.

In exemplary embodiments, the boot 140 has a bottom rim 126 that extends from the back portion 130 of the boot toward the front portion 132. The bottom rim 126 is angled upward such that the back wall 134 of the boot 140 is longer than the front wall 136 at the first and second edges 114, 118. The inside surface 138 of the boot 140 curves inward forming an area 142 having an increased thickness. The boot 140 curves inward toward the top portion 120. The curvature conforms to the anatomy of the lower leg and provides for positioning the boot 140 below the fetlock. With regard to the orientation of FIG. 14, in exemplary embodiments, the back 130 or right hand side of the boot 140 is designed to be heavier such that the center of gravity is disposed toward the back 130 or right hand side of the boot 140. This positioning for the center of gravity keeps the back of the boot 140 down and to the back of the hoof which helps to hold it in place.

Figure 16:
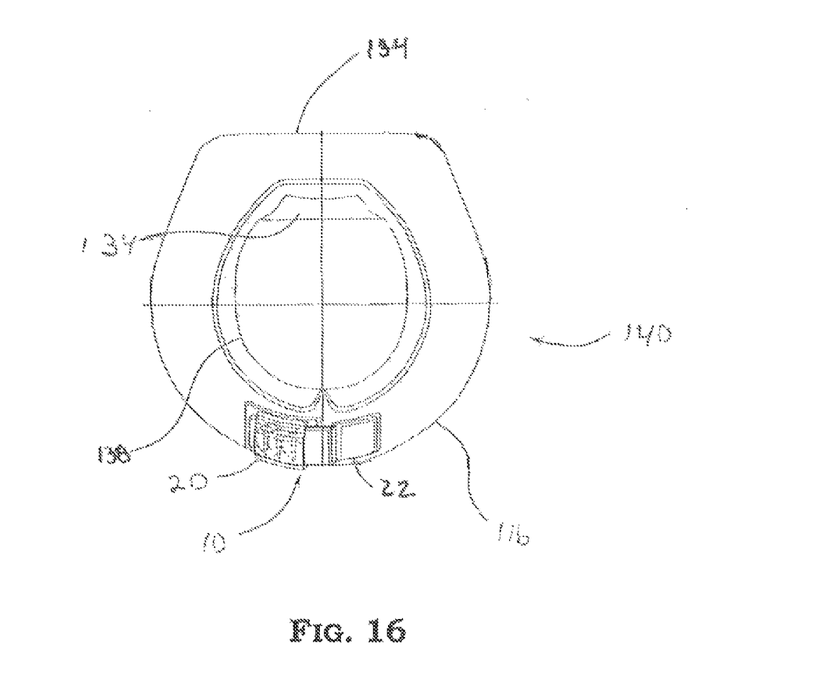
FIG. 16 is a is a top plan view of the fastener system and cuff of FIG. 12

Turning to FIG. 16, a top plan view shows the overall shape of the boot 140. The boot 140 includes the back wall 134 which may be generally flat or having less curvature than the surrounding area. On each side of the boot 140 at the bottom portion 124 there may be a curved transition section 144, 146 leads to an outwardly angled section 148, 150. The outwardly angled section 148, 150 leads to a curved section 152 that extends around the front. On the top of the boot 140 there is an outwardly flanged top section 154 forming the top rim 122 having a similar shape. At the back of the top rim 122 an inwardly extending portion 156 is visible. The inwardly extending portion 108 provides for maintaining the position of the boot 140 on the lower leg and prevents rotation.

Figure 1:
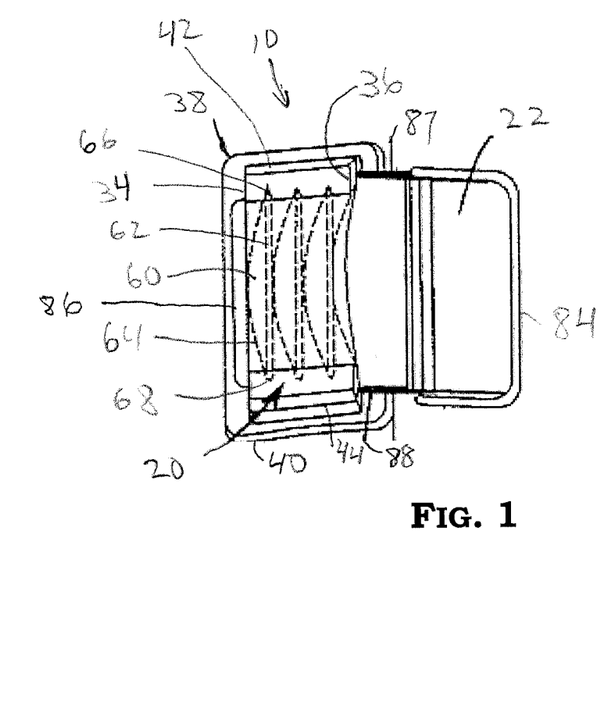
FIG. 1 is a front schematic view of one exemplary embodiment of a fastener system.
Figure 2:
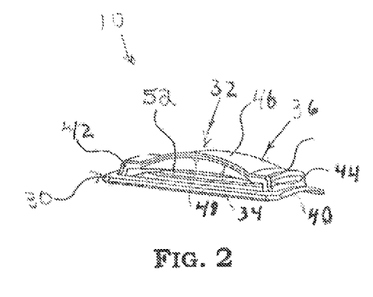
FIG. 2 is a first front perspective view of a detail of the buckle of the embodiment of FIG. 1.
Figure 3:
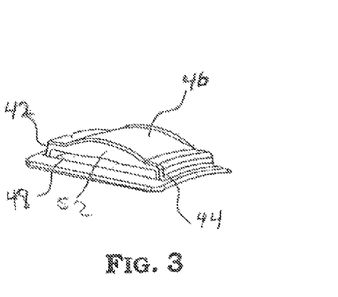
FIG. 3 is a second perspective view of a detail of the buckle of the embodiment of FIG. 1.
Figure 4:
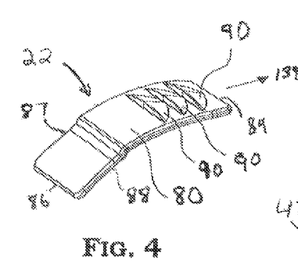
FIG. 4 is a top schematic perspective view of a strap of the embodiment of FIG. 1.
Figure 5:
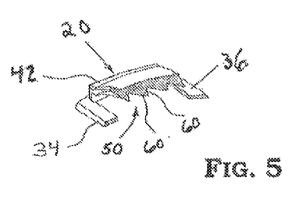
FIG. 5 is a schematic view in partial cutaway of the buckle.
Figure 6:
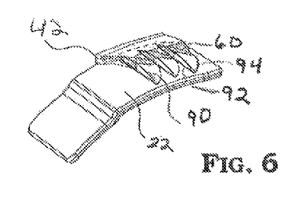
FIG. 6 is a partial cutaway view of the strap inserted into the buckle.
Figure 7:
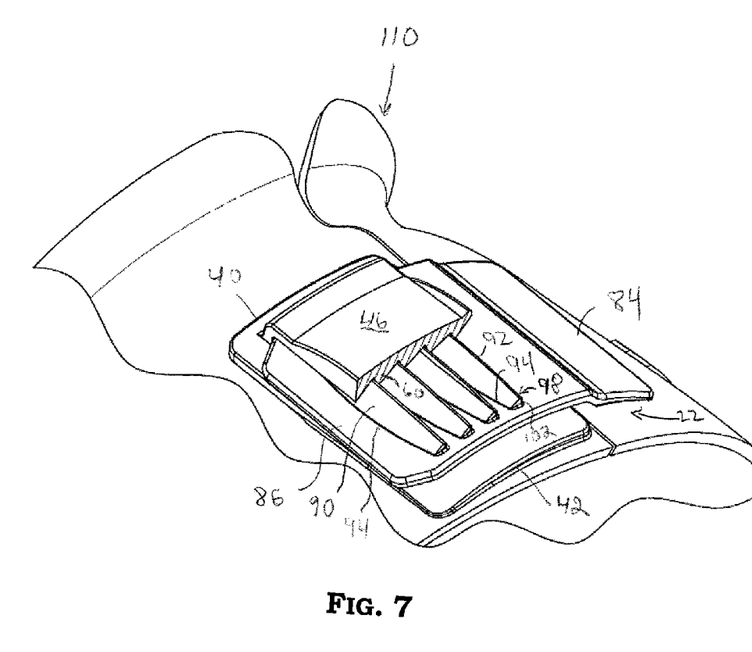
FIG. 7 is a detail partial cutaway view of the strap inserted into the buckle.
Figure 8:
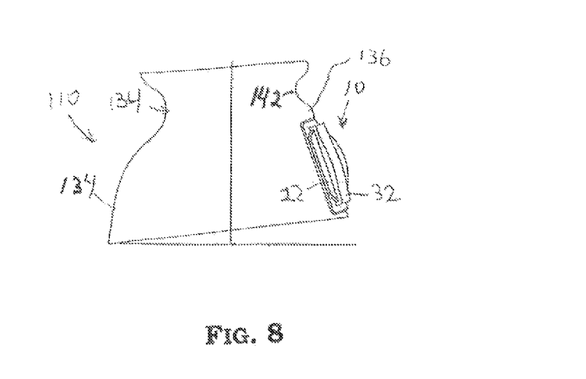
FIG. 8 is a side elevational view of a fastener system associated with a cuff according to one exemplary embodiment.

In FIG. 8, a side view of the boot 140 shows the curvature at the back of the boot 140. The boot 140 curves inward and then outward in hourglass fashion at the back 134. The angled bottom rim 126 is shown relative to an imaginary horizontal line. The additional length at the back 134 of the boot 140 provides for proper positioning of the boot 140 on the lower leg of the horse.

When the boot 140 is positioned around the leg, the first edge 114 and the second edge 118 are proximate to or abutting each other and can be maintained in a generally fixed relationship by means of the fastener system 10.

In exemplary embodiments, the fastener system 10 may be constructed of a suitable thermoplastic as will be evident to those of ordinary skill in the art based on this disclosure. In exemplary embodiments, the buckle 44 may be molded from PELLETHANE® thermoplastic polyurethane (TPU) 2102-90A, commercially available from The Lubrizol Corporation in Wickliffe, Ohio. In exemplary embodiments, the strap 22 may be constructed of a polyurethane with a hardness of about 55D. Other materials may also be suitable including other thermoplastics or other flexible materials and the like.

In exemplary embodiments, in an alternative method of releasing the strap 22 from the buckle 20, the user may slightly lift a gripping boss 74 formed at the front of the opening. By pulling up on the gripping boss 74, the material deforms as the height of the channel 50 increases and the top of the buckle 20 (and the slots 60) at least partially disengage from the teeth 90 allowing the teeth 90 and the strap 22 to slide out of the channel 50, thereby releasing the strap 22.

Figure 11:
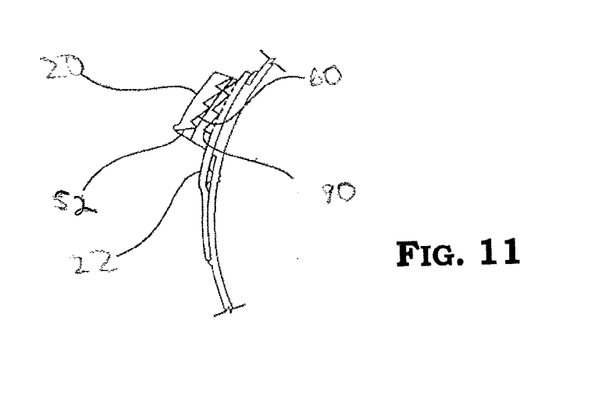
FIG. 11 is a sectional view showing partial disengagement of the teeth from the slots.
Figure 12:
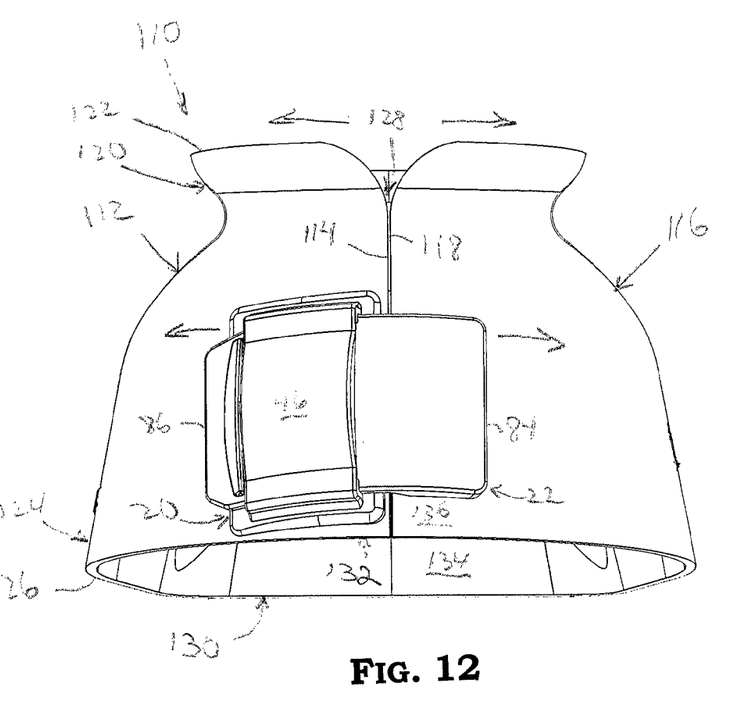
FIG. 12 is a side perspective view of one exemplary embodiment of a fastener system and a cuff, showing the lines of asymmetric separating force.
Figure 13:
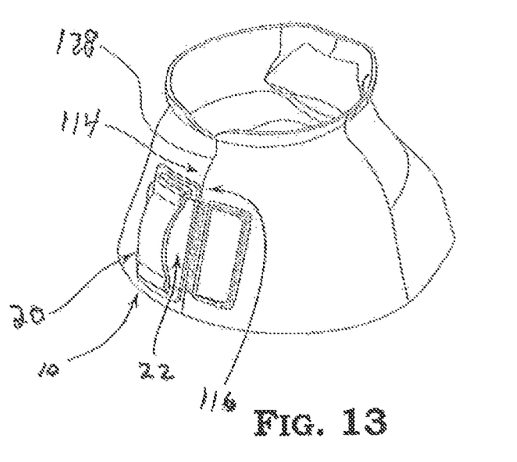
FIG. 13 is a perspective view of the fastener system and cuff of FIG. 12.
Figure 14:
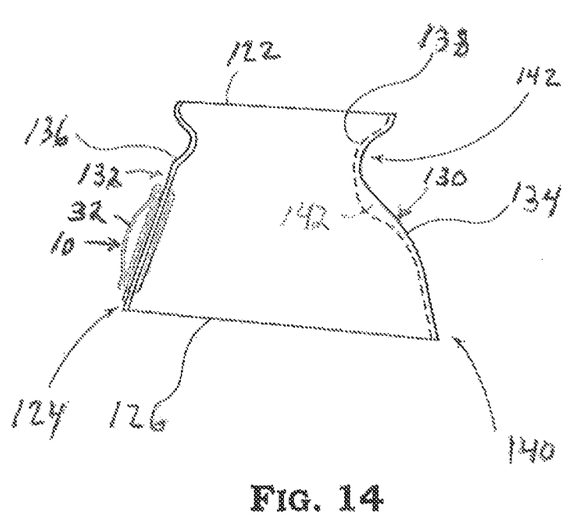
FIG. 14 is a side elevational view of the fastener system and cuff of FIG. 12.
Figure 15:
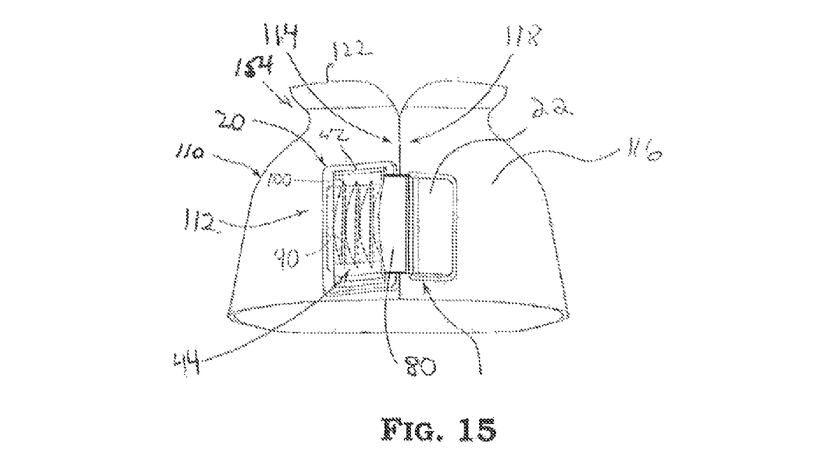
FIG. 15 is a front elevational view of the fastener system and cuff of FIG. 12.

The teeth 90 are pulled away from the slots 60 as shown in FIG. 11. Once the slots 60 and the teeth 90 are disengaged, the strap 22 can be easily removed from the buckle 20 and the boot 140 can be removed from around the lower leg of the horse.

Figure 9:
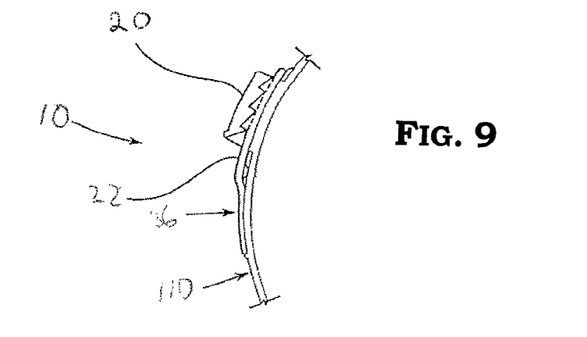
FIG. 9 is a sectional view showing the buckle in the closed position.
Figure 10:
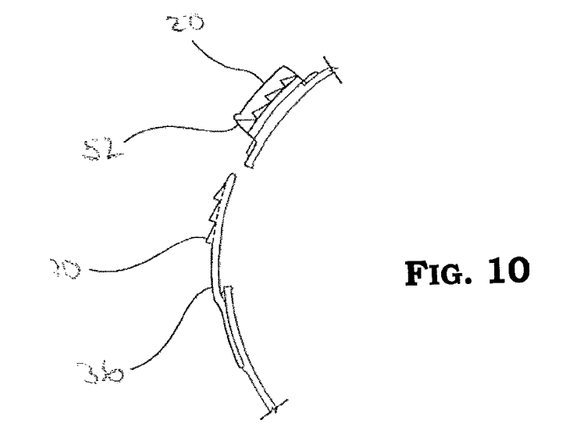
FIG. 10 is a sectional view showing the buckle in the open position.

Turning to FIGS. 9-11, the operation of the buckle 38 is shown in a detailed side view. In FIG. 9, the strap 86 has been inserted into the receiving member 74 and the teeth 83 on the strap 86 are lockingly engaged with the slots 80 in the receiving member 74 such that the strap 86 can be moved in the first direction 139 but cannot be moved in the second direction 142 because the teeth 83 engage with the second walls 136. FIG. 10 shows the male buckle member 41 and the female buckle member 44 before they are engaged by pushing the strap 86 into the receiving member 74 in the direction 139. In FIG. 11, the strap 86 is being released from the receiving member 74 by asymmetrically pulling the first and second edges of the boot 140 apart proximate to the top portion 120.

In an alternative exemplary embodiment, a fastener system may comprise a buckle having, rather than slots, a plurality of teeth extending downward from a top member toward a base, each tooth being as described herein above with respect to the teeth 83. Additionally, a strap may include, rather than teeth, a plurality of slots that are adapted to engage the teeth in the buckle.

In exemplary embodiments, the fastener described herein can be used with objects other than a cuff, such as, but not limited to, a helmet chin strap, belt, strapping system, safety vest, harness, and other structures where the typical separating forces exerted on the buckle and strap are typically evenly spaced across the width of the buckle and the strap, but not where the separating force is typically exerted at one side or the other of the buckle and the strap.

In one exemplary embodiment, a race driver's helmet chin strap system may have one end of the strap associated at one end with a buckle as described herein. The other end of the strap may be associated with a strap as described herein. When the buckle and strap are fastened together, the fastener may resist disengagement when the separating force on each of the helmet's chin straps are generally evenly across the width of the chin straps, such as in the situation of a front end collision, when the driver's head is thrust forward and the helmet and chin straps are generally forced forward by momentum. The driver can separate the buckle from the strap by pulling each chin strap proximate to the buckle and the strap at the top side or bottom side of each.

Figure 20:
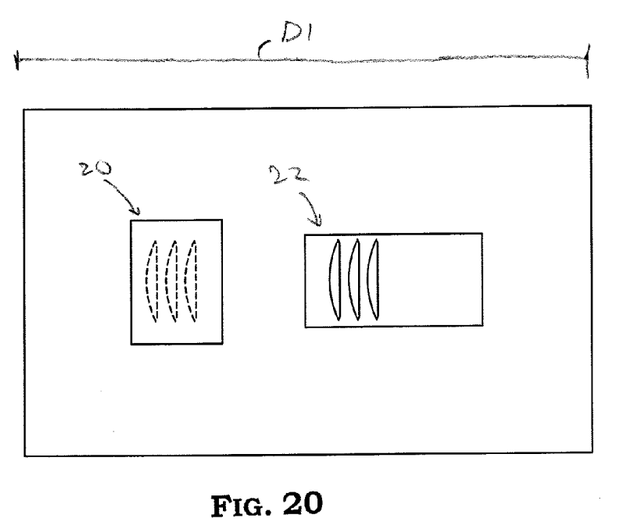
FIG. 20 is a front elevational view of an exemplary embodiment of a disengaged fastener system and a fabric or other flexible material article, such as, but not limited to, a jacket sleeve or pant leg.
Figure 21:
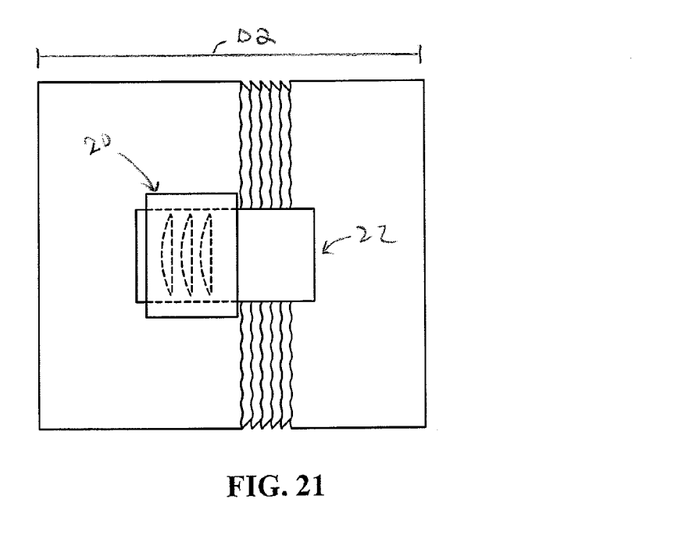
FIG. 21 is a front elevational view of an exemplary embodiment of an engaged fastener system of the article of FIG. 20.

In one exemplary embodiment, a fastener system as described herein may be used with a cuff made of a flexible material in which the diameter of the cuff can be reduced when the buckle is engaged with the strap. In such an embodiment, a cuff is provided that has a generally cylindrical shape or conical frustum shape, and may be formed as a roughly barrel shape without first and second side edges, as illustrated in FIGS. 20-21, or may have an opening formed by a first side edge and second side edge, as described hereinabove. The cuff may be formed of a flexible material, such as, but not limited to, fabric, film, plastic, cloth, or the like, or possibly a material having flutes. The cuff circumference generally has a first section and a second section. A buckle according to exemplary embodiments described herein is associated with the first section and a strap according to exemplary embodiments described herein is associated with the second section. In a first expanded configuration the cuff has a diameter D1. A user can fit the cuff over an object, such as, but not limited to an arm, wrist, or leg, a tree, or other object whereby the cuff diameter D1 is substantially larger than the width or diameter of the object around which the cuff is fitted. The user desiring to reduce the diameter D1 can engage the strap with the buckle to effectively gather a portion of the cuff material disposed between the points where the buckle and strap are associated with the first and second sections of the cuff, thereby reducing the cuff diameter to a diameter D2. This can effectively make the cuff fit more snugly around the object it is fitted. When a user wants to expand the cuff he or she disengages the strap as described hereinabove. It is to be understood that the term cuff is meant to include both the "end" of a length of material (e.g., a shirt sleeve, pant leg, or the like) as well as any portion between two ends (e.g., the elbow or knee portion of a sleeve or pant leg). The references to clothing articles are intended as being exemplary only and not limiting the cuff to clothing articles. Such a cuff in this embodiment may also be, but it not limited to, a material that can be The cuff in such an exemplary embodiment may have first and second side edges that can be joined together, such as by a zipper, buttons, snaps, hook and loop fastener, or other fastening means. This would allow the cuff to be fitted around an object, such as a tree, where is impracticable to slide it over an end of the object. Alternatively, the first and second side edges may be connected by at least one strip of elastic material.

In exemplary embodiments, a fastenable strap or belt (referred to hereinbelow as a belt only to distinguish for the reader this structure from the strap 22 that is part of the fastener system) is provided incorporating a fastener system as described herein. A belt may be a length of material that is made of a flexible material. Alternatively, the belt may made of a set of links or sections of rigid material that are connected, such as, but not limited to, chain links, loops. Alternatively, the belt may be made of a plurality of sections that are each connected by a hinge or pin. In exemplary embodiments, at least a portion of the belt may be made of an elastic material. At opposing ends of the belt are associated a buckle and a strap as described in one of the exemplary embodiments provided herein. The belt can be fastened around an object. The belt will resist expansion of its diameter (beyond the expandability of the belt material) when expansion force is applied generally symmetrically across the width of the buckle and the strap. The belt buckle and strap can be disengaged from one another by a user exerting asymmetrical separating force at the top edge of the buckle and/or the strap, or at the bottom edge of the buckle and/or strap.

In exemplary embodiments, the fastener system as described herein in various embodiments may be incorporated into or associated with objects in which the buckle is associated with an object or portion thereof that is generally immovable with respect to the strap, or vice versa (i.e., the strap portion being immovable with respect to the buckle). In an exemplary embodiments, a user wishing to disengage the strap from the buckle may pull on, in which the buckle is relatively immovable, the user can grasp the strap portion and pull from generally the top or the bottom edge to disengage the strap from the buckle channel. Conversely, where the strap is relatively immovable, the buckle can be similarly grasped and pulled away from the strap by pulling at generally the top or bottom edge of the buckle.

Horse leg boots, clothing, footwear, jewelry, backpacks, arm or waist technology holders, pet collars and leads, cargo and tie down straps, lanyards, safety latches for child and/or home security, luggage, athletic braces and supports, slings.

Figure 22:
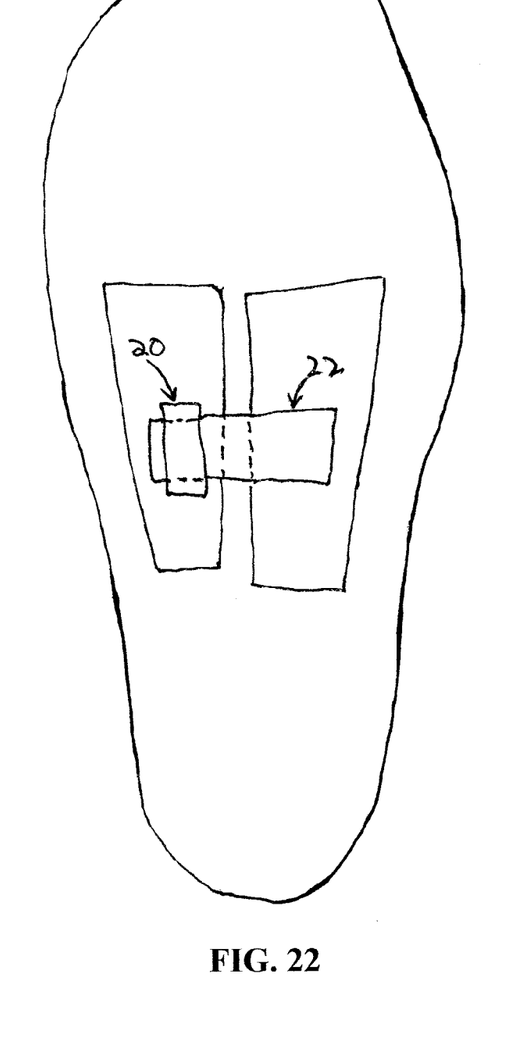
FIG. 22 is a top plan view of an exemplary embodiment of a shoe incorporating a fastener system as described herein.

In one exemplary embodiment, the fastener system as described herein may be used with a shoe, as illustrated in FIG. 22, in which a shoe (or a boot) has a buckle associated with a first facing of the shoe and a strap associated with a second facing of the shoe. In exemplary embodiments, two or more buckles and straps can be associated with the shoe. In exemplary embodiments, the shoe can be the part of a skin diving or scuba diving fin in which the diver's foot is placed. The buckle and strap can be associated with either side of the top of the fin area so that a user's foot can be inserted in the shoe area and then strapped in by fastening the fastener.

Although only a number of exemplary embodiments have been described in detail above, those skilled in the art will readily appreciate that many modifications are possible in the exemplary embodiments without materially departing from the novel teachings and advantages. Accordingly, all such modifications are intended to be included within the scope of this disclosure as defined in the following claims.

The invention claimed is:

1. A releasable fastener system for an equine boot, comprising:
 a. a buckle comprising
  i. a base of flexible material,
  ii. a top member of flexible material, the top member having a front edge, a rear edge and an upper surface, the top member being coupled to the base at a first leg and a second leg,
  iii. a channel comprising an opening between the base, the top member and the first and second legs, and
  iv. a plurality of generally parallel slots defined in the top member, each slot having a front side being generally straight, a rear side being curved and being tapered in a direction from the top member rear edge toward the top member front edge; and
 b. a strap configured to releasably be engaged in the channel, the strap comprising a member of flexible material, the strap having a length, a width, a top surface and a bottom surface, the strap further comprising
  i. a first end at one end of the length and a second end at an opposite end of the length,
  ii. a side edge at one side of the width and an opposite side edge at an opposite side of the width, and iii. a plurality of teeth on and extending generally upward from the top surface, each of said plurality of teeth having an elongated first side wall extending generally perpendicularly upward from the strap, and an elongated second side wall tapering from the first side wall in a direction from the strap first end toward the second end, the second side wall being curved, each of said plurality of teeth further including a first short edge and opposing second short edge, each short edge having a shoulder, whereby said plurality of generally parallel slots are adapted configured to engage said plurality of teeth when the strap first end and at least one of said plurality of teeth are inserted into the buckle channel in a first direction generally perpendicular to said plurality of generally parallel slots so as to be fastened and resist removal in a direction opposite to the first direction, and whereby the strap is configured to disengage from the buckle when a force asymmetrical with respect to the first direction is exerted on one of the strap and buckle so as to cause the plurality of generally parallel slots and said plurality of teeth to disengage thereby facilitating removal of the strap from the buckle in a direction generally opposite to the first direction.

2. The releasable fastener system of claim 1, wherein the strap is coupled to a cuff.

3. The releasable fastener system of claim 2, wherein the cuff comprises an equine boot having an open top and an open bottom and the boot is adapted to wrap around the bottom portion of a horse's leg so that edges of the boot form a seam extending from the open top to the open bottom when the boot is fastened to the horse's leg.

4. The releasable fastener system of claim 3, wherein the equine boot is generally conical frustum-shaped with the open top having a narrower diameter than the open bottom.

5. The releasable fastener system of claim 1, wherein removal of the strap from the buckle by the asymmetrical force is facilitated by the buckle and strap comprising a soft flexible material.

6. The releasable fastener system of claim 5, wherein the soft flexible material comprises polyurethane.

7. The releasable fastener system of claim 1, wherein removal of the strap from the buckle is facilitated by applying a force to increase the opening between the base and the top member.

8. The releasable fastener system of claim 1, the strap resists disengagement when a force is applied in a direction generally opposite to the first direction.

9. The releasable fastener system of claim 3, wherein the cuff has sufficient weight to stay in a correct position with respect to a horse's hoof and to prevent it from rotating about the hoof.

10. The releasable fastener system of claim 3, wherein the center of gravity of the cuff is disposed toward the back or right-hand side of the cuff.

11. The releasable fastener system of claim 6, wherein the soft flexible material comprises elastomeric polyurethane.

\* \* \* \* \*